United States Patent [19]

Chadwick et al.

[11] Patent Number: 4,600,757
[45] Date of Patent: Jul. 15, 1986

[54] PROCESS FOR THE PREPARATION OF POLYISOPRENE

[75] Inventors: John C. Chadwick, Amsterdam, Netherlands; Brian L. Goodall, Houston, Tex.

[73] Assignee: Shell Oil Company, Houston, Tex.

[21] Appl. No.: 725,196

[22] Filed: Apr. 18, 1985

Related U.S. Application Data

[63] Continuation of Ser. No. 542,817, Oct. 17, 1983, abandoned.

[30] Foreign Application Priority Data

Oct. 27, 1982 [NL] Netherlands ......................... 8204147

[51] Int. Cl.[4] .......................... C08F 4/64; C08F 36/08
[52] U.S. Cl. .................................... 526/142; 502/125; 526/141; 526/340.2
[58] Field of Search ................................ 526/141, 142

[56] References Cited

U.S. PATENT DOCUMENTS

| 3,165,503 | 1/1965 | Kahn et al. | 526/141 |
| 3,455,891 | 7/1969 | Winkler et al. | 526/141 |
| 3,567,702 | 3/1971 | Mori et al. | 526/142 |
| 3,864,278 | 2/1975 | Heij et al. | 252/429 B |

FOREIGN PATENT DOCUMENTS 21478 1/1981 European Pat. Off. .

Primary Examiner—Edward J. Smith
Attorney, Agent, or Firm—Dean F. Vance

[57] ABSTRACT

A process for the preparation of polyisoprene by polymerizing isoprene in the presence of a beta-$TiCl_3$ containing catalyst is disclosed thereby an activator is prepared by reacting a hydrocarbylaluminum compound and a hydroxy-aromatic compound, having at both ortho-places with respect to the hydroxy-group a secondary or tertiary alkyl-group.

9 Claims, No Drawings

PROCESS FOR THE PREPARATION OF POLYISOPRENE

This is a continuation of application Ser. No. 542,817, filed Oct. 17, 1983, now abandoned.

BACKGROUND OF THE INVENTION

The invention relates to a process for the preparation of polyisoprene by polymerizing isoprene in an inert diluent in the presence of a beta-$TiCl_3$-containing catalyst and an activator.

The Netherlands patent application No. 7316397 discloses a process for the preparation of polyisoprene by mixing $TiCl_4$, trihydrocarbylaluminum and ether, then aging the reaction mixture thus obtained and adding to this aged catalyst mixture, prior to it being brought into contact with isoprene, a dihydrocarbylaluminum chloride. This process gives polyisoprene with a high cis-1,4 content. Especially at high (40° C.) polymerization temperatures, however, the degree of isoprene conversion is not very high. Degree of conversion is here defined as the amount of isoprene converted, expressed as a percentage of the total amount of isoprene added to the mixture subjected to polymerization.

The European patent application No. 0021478 discloses a process for polymerizing an alpha-olefin with the aid of a catalyst containing a titanium halide and a reaction product of a hydroxy-aromatic compound with in both ortho positions a secondary or tertiary alkyl group, a halogen-free organoaluminum compound and an organoaluminum halide, or of the aforesaid hydroxy-aromatic compound and an organoaluminum halide. This process is not concerned with polymerization by means of a beta-$TiCl_3$ containing catalyst, nor with the polymerization of dienes.

BRIEF SUMMARY OF THE INVENTION

The invention relates to a process for the preparation of polyisoprene by polymerizing isoprene in an inert diluent in the presence of a beta-$TiCl_3$ containing catalyst and an activator, characterized in that an activator is used which is prepared by reacting a hydrocarbylaluminum compound with a hydroxy-aromatic compound containing in both ortho positions relative to the hydroxyl group a secondary or tertiary alkyl group.

With this new process it is possible to obtain polyisoprene with a high cis-1,4 content, a suitable limiting viscosity number (LVN), and a satisfactory gel content, while at the same time an attractive degree of conversion can be achieved at both low and high polymerization temperatures.

DETAILED DESCRIPTION OF THE INVENTION

The beta-$TiCl_3$ containing catalyst according to the present invention is prepared by methods known in the art. Preferably, methods are used wherein $TiCl_4$, a trihydrocarbylaluminum compound such as triethyl aluminum (TEA) or triisobutyl aluminum (TIBA), and preferably a Lewis base are brought into contact with one another.

The Lewis base can consist of, for example, an ether or an amine.

Suitable ethers are those which can be represented by the formula R"—O—R', where R" and R' can be the same or different alkyl, cycloalkyl, aryl or alkenyl groups. Diethyl ether, di-n-propyl ether, di-n-butyl ether, di-isoamyl ether, anisol, di-n-hexyl ether, n-propyl-phenyl ether and diphenyl ether can, for example, be used. The most preferred of these is di-n-butyl ether.

Suitable amines are primary monoamines, such as methylamine, ethylamine, butylamine, hexylamine, phenylamine, benzylamine and octylamine; secondary monoamines, such as diethylamine, dibutylamine, dihexylamine, diphenylamine, ethylhexylamine and dicyclohexylamine; tertiary amines such as pyridine and quinoline. Diaryl amines and primary alkyl amines in which the alkyl groups have 1–8 atoms are the most preferred.

The molar ratio of the Lewis base and the trihydrocarbylaluminum compound ($AlR_3$) in the beta-$TiCl_3$ containing catalyst is between 0.01:1 and 10:1, preferably between 0.1:1 and 1:1.

$TiCl_4$, trihydrocarbylaluminum compound ($AlR_3$) and Lewis base are, with stirring, brought into contact with one another at a temperature preferably between −70° C. and +30° C. The reaction is usually continued for 0.5 to 4 hours with stirring.

The order in which the reactants are added is not critical, provided that $TiCl_4$ and the Lewis base are not mixed with each other in the absence of $AlR_3$. $AlR_3$ and $TiCl_4$ may be mixed with each other, whereupon the Lewis base is added, but preferably the Lewis base is mixed with $AlR_3$ and this mixture is then added to $TiCl_4$.

After stopping agitation, the reaction mixture is preferably aged. Although aging temperatures up to 100° C. may be employed, preferred temperatures are below 30° C., in particular between 15° C. and 25° C. Aging times can vary from 1 day to, for example, 60 days.

The hydroxy-aromatic compounds employed for the preparation of the activator according to the invention are those containing a secondary or tertiary alkyl group in both ortho positions relative to the hydroxyl group. Preferred compounds of this type are 2,6-di-tert-alkyl-hydroxy benzenes, which may have other substituents in the ring structure than hydrogen. Example of such compounds are 2,6-di-tert-butylhydroxybenzene, 2,6-di-tert-butyl-4-methylhydroxybenzene, 2,6-di-tert-decyl-4-methoxyhydroxy-benzene, 2,6-di-tert-butyl-4-isopropyl-hydroxybenzene, tri-(2,6-di-tert-hexyl-hydroxyphenyl)benzene, 1,3,5-tri-(2,6-di-tert-butylhydroxyphenyl)-2,4,6-trimethylbenzene, 2,2-di-(2,6-di-tert-butylhydroxyphenyl)propane, di-(2,6-di-tert-butylhydroxyphenyl)methane, and 2,6-di-tert-amyl-4-n-butyl-hydroxybenzene. Of these, 2,6-di-tert-butyl-4-methyl-hydroxybenzene is the most preferred.

Suitable hydrocarbylaluminum compounds which can be employed in the preparation of the activator are trihydrocarbylaluminum compounds and dihydrocarbylaluminum chlorides. The most preferred compound is diethylaluminum chloride (DEAC), followed by triethylaluminum (TEA).

The preparation of the activator can take place in the presence of the beta-$TiCl_3$ containing catalyst. Preferably, however, the activator is prepared separately from the beta-$TiCl_3$ containing catalyst, it thus being possible to prepare the activator in the mixture to be subjected to polymerization. If the activator is prepared separately from both the beta-$TiCl_3$ containing catalyst and the mixture to be subjected to polymerization, it can, after its preparation, be admixed with the beta-$TiCl_3$ containing catalyst before being added to the mixture to be subjected to polymerization. This mixing of the activator and the beta-$TiCl_3$ containing catalyst should be done as shortly as possible before the start of the polymerization. Preferably, however, the activator is added first to the mixture, the catalyst being added some time later (1–60 minutes).

The molar ratio of the hydroxy-aromatic compound to the hydrocarbylaluminum compound is preferably between 0.5:1 and 2:1. If the hydrocarbylaluminum compound is a trihydrocarbylaluminum compound, such as TEA, this ratio is preferably greater than or equal to 1:1. The temperature at which the activator is prepared is not critical and may lie between $-30°$ C. and $100°$ C. The reaction may be carried out both in the absence or in the presence of an inert diluent, such as n-pentane, isopentane, isooctane, or tertiary amylenes. If the catalyst and the activator are combined, the molar ratio of activator to $TiCl_3$ should lie between 0.01:1 and 2.0:1, preferably between 0.05:1 and 1.0:1.

The temperature at which the beta-$TiCl_3$ containing catalyst and the activator are mixed is not critical and can be the same as the polymerization temperature.

Suitable titanium concentrations in the reaction mixture during the polymerization are generally below 20 milliatoms, preferably between 0.05 and 5 milliatoms titanium per liter.

The catalyst, with or without the activator, can be added continuously to the mixture to be polymerized. It is also possible to add the catalyst, with or without the activator, stepwise, whereby the portions being added need not be equal and whereby the intervals between each increment need also not be equal. If the activator is added separately from the catalyst to the mixture to be polymerized, this addition can also be continuous or stepwise. Similarly, the hydroxy-aromatic compound and the hydrocarbylaluminum compound can be added continuously or stepwise to the mixture to be polymerized.

In these methods of addition the titanium concentration in the reaction mixture and the catalyst/activator ratio can lie outside the aforementioned limits. By the end of the addition the above concentration and ratio will generally lie within these limits.

The polymerization, which can also be continuous or stepwise, is carried out in an inert diluent chosen from aliphatic, olefinic or cycloaliphatic hydrocarbons or mixtures thereof. Preferred solvents are isopentane, cyclohexane, toluene, tertiary amylenes and other mixtures containing aliphatic and/or olefinic hydrocarbons, mainly with 5 carbon atoms. The term tertiary amylenes is used for a hydrocarbon mixture containing mainly 2-methyl-1-butene and 2-methyl-2-butene.

If during polymerization the liberated heat is removed by evaporative cooling, preferred solvents are isopentane, tertiary amylenes, and other mixtures containing aliphatic and/or olefinic hydrocarbons mainly with 5 carbon atoms.

The mixture to be polymerized contains inert diluent and 10–50 wt% of isoprene to which preferably a dihydrocarbylaluminum chloride such as diethylaluminum chloride (DEAC) at a concentration of 0.01–10 mmol, preferably 0.1–3 mmol per liter of mixture is added. If there is sufficient of this DEAC in the solvent, the hydroxy-aromatic compound according to the invention can be added to it. The mixture to be polymerized need not contain DEAC if the activator is prepared in sufficient excess of DEAC and is added to this mixture before the beta-$TiCl_3$ containing catalyst is added.

The polymerization, which is performed according to methods known in the art, can be continued until polyisoprene concentrations of 5–50 wt% are obtained in the solvent. The polymerization temperature is between $-25°$ C. and $+120°$ C., in particular between $-5°$ C. and $+80°$ C., and more in particular between $35°$ C. and $60°$ C., the heat liberated during polymerization being removed advantageously by evaporative cooling.

Preferably, isoprene is homopolymerized. Other dienes such as piperylene may be present in small amounts, e.g., less than 0.5 wt% based on total dienes. Higher amounts tend to decrease the polymerization rate and the cis-1,4 content and molecular weight of the polyisoprene. Butadiene may be present in larger amounts, e.g., 2%. The isoprene feed, as well as the solvent, may be purified by methods known in the art, for example by distillation, treatment with a sodium dispersion, or percolation over a molecular sieve.

The invention is further illustrated in the following Examples, in which the following standard determinations are performed:

gel content: 0.5 g sample (polyisoprene) and 50 ml cyclohexane were mixed for 48 hours; after the addition of 150 ml pentane the mixture was centrifuged for 60 minutes (3000 rpm); after determination of the quantity of rubber in the above liquid the gel content was calculated from:

$$\frac{\text{quantity of sample (g)} - \text{quantity of rubber in above liquid (g)}}{\text{quantity of sample (g)}} \times 100\%$$

degree of conversion in Examples on 250 ml scale: after stopping polymerization by addition of methanol the solvent and unconverted isoprene were removed by steam stripping; the isoprene rubber remaining was then dried and weighed. The degree of conversion was calculated from:

$$\frac{\text{yield of isoprene rubber (g)}}{\text{initial quantity of isoprene monomer (g)}} \times 100\%$$

degree of conversion in Example 3: The percentage by weight of the initial isoprene monomer is known. After x minutes a sample of the polymerizing mixture was run off into a pre-weighed flask containing some methanol. The solvent and unconverted isoprene were removed by steam stripping; the isoprene rubber remaining was then dried and weighed. The weight percentage of rubber in the sample was calculated from:

$$\frac{\text{quantity of isoprene rubber (g)}}{\text{sample weight (g)}} \times 100\%$$

The degree of conversion was calculated from:

$$\frac{\text{wt \% of rubber in the sample}}{\text{wt \% of isoprene monomer at start of polymerization}} \times 100\%$$

The limiting viscosity number (LVN) was determined at $25°$ C. in toluene.

the cis-1,4 content was determined by means of IR analyses.

EXAMPLES

Example 1

(a) Preparation of beta-$TiCl_3$ containing catalyst: tri-isobutylaluminum (TIBA) dissolved in isooctane (100 mmol/l), and di-n-butyl ether (DBE) dissolved in isooctane (500 mmol/l), were mixed in such quantities that the molar ratio of DBE to TIBA in the mixture was 1:4. To 1.2 mmol $TiCl_4$ dissolved in isooctane (100 mmol/l) was added a quantity of the above mixture at −20° C. such that the molar ratio of TIBA of $TiCl_4$ was 0.85:1. This was then agitated for 1 hour at −20° C. and 1 hour at 23° C.

(b) Preparation of activator: DEAC, dissolved in isooctane (90 mmol/l), was reacted with an equimolar quantity of 2,6-di-tert-butyl-4-methyl-hydroxybenzene (Ionol). The reaction was continued for 2 hours at 23° C. The activator obtained in this way was added 10 minutes before the start of polymerization in such a quantity to the beta-$TiCl_3$ containing catalyst that the molar ratio of activator to $TiCl_3$ was 1:4.

(c) Polymerization: To 250 ml isopentane+isoprene (20 wt%), to which 0.125 mmol DEAC had been added, was added a quantity of the catalyst/activator system equivalent to 0.5 mmol $TiCl_3$. This was polymerized for one hour in a closed system at 23° C. and 50° C. respectively. An analogous experiment was performed with an activator consisting of the reaction product of Ionol and di-isobutylaluminum chloride (DIBAC). For the sake of comparison, a polymerization was in each case carried out in the absence of the activator. The results are shown in Table 1. The results of the control trials are given between brackets.

TABLE 1

| Activator | Polymerization temperature °C. | Isoprene conversion % | LVN dl/g | cis-1,4 content % |
|---|---|---|---|---|
| Ionol + DEAC | 23 | 92 (89) | 4.37 (3.58) | 96.9 (97.2) |
| | 50 | 81 (61) | 2.69 (2.71) | 96.7 (97.0) |
| Ionol + DIBAC | 23 | 93 (90) | 4.02 (3.89) | |
| | 50 | 69 (61) | 2.86 (2.92) | |

Example 2

(a) Preparation of beta-$TiCl_3$ containing catalyst: TIBA, dissolved in isooctane (1 mol/l), and DBE or n-butylamine (BA) were admixed and reacted with each other in such amounts that the molar ratio of Lewis base to TIBA in the mixture was 1:4. To 10 mmol $TiCl_4$ dissolved in isooctane (1 mol/l) was added such an amount of the above mixture at 23° C. over a period of 5 minutes that the molar ratio of TIBA to $TiCl_4$ was 0.85:1. The mixture was then stirred for one hour at 23° C.

(b) Preparation of activator: The activator was prepared in two ways:
(1) Same as in Example 1, except that the DEAC concentration in the isooctane was now 1 mol/l. The activator thus obtained was added to the catalyst and agitated for 15 min. The molar ratio of activator to $TiCl_3$ was 1:4. After the number of days shown in Table 2 below, this catalyst/activator system was added to 250 ml isopentane+isoprene (20 wt%) containing 0.125 mmol DEAC. The amount added was equivalent to 0.5 mmol $TiCl_3$. Polymerization was effected for one hour at 45° C.
(2) 0.25 mmol DEAC, dissolved in isooctane (1 mol/l), and 0.125 mmol Ionol were added to 250 ml isopentane+isoprene (20 wt%) and reacted for 30 min. at 45° C. An amount of catalyst equivalent to 0.5 mmol beta-$TiCl_3$ and which had been aged for the number of days shown in Table 2 was then added. Polymerization was effected for one hour at 45° C.

TABLE 2

| | Aging in days | Isoprene conversion, % | LVN dl/g |
|---|---|---|---|
| BA catalyst to which activator has been added | 1/24 | 66 | 4.4 |
| | 6 | 43 | 5.1 |
| | 20 | 39 | — |
| BA catalyst; DEAC + Ionol added to the mixture to by polymerized | 1/24 | 71 | 3.9 |
| | 6 | 81 | 4.0 |
| | 20 | 78 | 4.3 |
| | 62 | 80 | 4.2 |
| DBE catalyst to which activator has been added | 1/24 | 82 | 4.2 |
| | 10 | 62 | 6.1 |
| | 24 | 55 | — |
| DBE catalyst; DEAC + Ionol added to the mixture to by polymerized | 1/24 | 73 | 3.8 |
| | 10 | 87 | 3.7 |
| | 24 | 89 | 3.9 |
| | 66 | 91 | 4.1 |

These experiments show that it is advantageous to add the activator to the catalyst as shortly as possible before the start of the polymerization or to prepare the activator in the mixture to be polymerized.

Example 3

(a) Preparation of beta-$TiCl_3$ containing catalyst: TIBA and Lewis base (both dissolved in isooctane, 1 mol/l) were mixed and, during agitation, were added to $TiCl_4$ (1 mol/l in isooctane). Agitation was continued for 2 hours without cooling. Both DBE and n-butylamine (BA) were employed as Lewis base. From this stage onwards the method of preparation was the same as in Example 1.

(b) Activator preparation:
(1) As in Example 1: the activator (Ionol+DEAC) was added to the catalyst 15 minutes before polymerization. The molar ratio of activator to $TiCl_3$ was 1:4.
(2) 15 minutes before the start of polymerization 6 mmol Ionol and 9 mmol DEAC were added separately to the mixture to the polymerized, as in Example 2.

(c) Polymerization: the beta-$TiCl_3$ containing catalyst was added stepwise (3 mmol $TiCl_3$ every 20 minutes; total 24 mmol $TiCl_3$) to 6 liters of the mixture to be polymerized, consisting of 20 wt% isoprene in tertiary amylenes (TA), to which 3 mmol DEAC had been added if the activator was added to the catalyst. The polymerization temperature was 45° C.

The results are shown in Table 3.

TABLE 3

| Lewis base | activator | degree of isoprene conversion in wt %, after min. | | | | | | | | | | gel content in the finally obtained polyisoprene, wt % |
|---|---|---|---|---|---|---|---|---|---|---|---|---|
| | | 10 | 30 | 50 | 70 | 90 | 110 | 130 | 160 | 180 | 240 | |
| DBE | added to catalyst | 8 | 29 | 46 | 60 | 68 | 72 | 78 | 79 | 79 | 81 | 4.7 |
| DBE | Ionol + DEAC added to the mixture | 10 | 30 | 46 | 58 | 68 | 73 | 77 | 78 | 79 | 79 | 3.4 |
| BA | to be poly- | 15 | 33 | 51 | 64 | 72 | 76 | 81 | 83 | 84 | 84 | 2.1 |

TABLE 3-continued

| Lewis activator base merized | degree of isoprene conversion in wt %, after min. | | | | | | | | | | gel content in the finally obtained polyisoprene, wt % |
|---|---|---|---|---|---|---|---|---|---|---|---|
| | 10 | 30 | 50 | 70 | 90 | 110 | 130 | 160 | 180 | 240 | |

These tests show that by the employment of the activator according to the invention in combination with DBE or BA as Lewis base and TA as inert diluent a high degree of isoprene conversion can be achieved in combination with a low gel content.

What is claimed is:

1. A process for the preparation of polyisoprene by polymerizing a mixture of isoprene in an inert diluent in the presence of a beta-TiCl₃ containing catalyst, diethylaluminum chloride and an activator, characterized in that the said activator is prepared by reacting a hydrocarbylaluminum compound with a hydroxy-aromatic compound containing in both ortho positions relative to the hydroxyl group a secondary or tertiary alkyl group, wherein
   (a) the molar ratio of the hydroxy-aromatic compound to the hydrocarbylaluminum compound is between 0.5:1 and 2:1;
   (b) the hydroxy-aromatic compound is a 2,6-di-tert-alkylhydroxybenzene compound;
   (c) the polymerization is effected at a temperature between 35° C. and 60° C.;
   (d) the molar ratio of activator to beta-TiCl₃ after mixing the activator and catalyst together is between 0.05:1 and 1.0:1;
   (e) said beta-TiCl₃ catalyst being obtained by mixing a Lewis base with a trihydrocarbyl aluminum compound (AlR₃) and TiCl₄;
   (f) said hydrocarbylaluminum compound being selected from the group consisting of diethylaluminum chloride and triethyl aluminum; and
   (g) said diethylaluminum chloride in said mixture being present at a concentration of 0.01 to 10 millimoles per liter of mixture.

2. The process according to claim 1, characterized in that the hydrocarbylaluminum compound is diethylaluminum chloride.

3. The process according to claim 1, characterized in that the hydrocarbylaluminum compound is triethylaluminum and the molar ratio of triethylaluminum to the hydroxy-aromatic compound is <1:1 and >0.5:1.

4. The process according to claim 1, characterized in that 2,6-di-tert-butyl-4-methylhydroxybenzene is employed.

5. The process according to claim 1, characterized in that polymerization is effected with evaporative cooling.

6. The process according to claim 1, characterized in that in the preparation of the beta-TiCl₃ containing catalyst an ether is used which functions as a Lewis base and is represented by the formula R″—O—R′ where R″ and R′ are the same or different alkyl, cycloalkyl, aryl, or alkenyl groups.

7. The process according to claim 1, characterized in that in the preparation of the beta-TiCl₃ catalyst a diarylamine or a primary alkylamine, where the alkyl groups have 1-8C atoms, is employed as Lewis base.

8. The process according to claim 1 wherein said activator is added to the isoprene and inert diluent prior to the addition of said catalyst.

9. The process according to claim 1 wherein said activator and said catalyst are combined just prior to addition to the mixture of isoprene and inert diluent.

* * * * *